May 8, 1962 K. R. PORLAND 3,033,464

MIXING VALVE FOR HOT AND COLD WATER INSTALLATIONS

Filed Nov. 24, 1959 2 Sheets-Sheet 1

United States Patent Office 3,033,464
Patented May 8, 1962

3,033,464
MIXING VALVE FOR HOT AND COLD
WATER INSTALLATIONS
Kjeld Richard Porland, Elsmark, Nordborg, Als, Denmark, assignor to Danfoss ved ingenior Mads Clausen, Elsmark, Nordborg, Denmark, a firm of Denmark
Filed Nov. 24, 1959, Ser. No. 855,060
Claims priority, application Denmark Nov. 26, 1958
1 Claim. (Cl. 236—12)

There has been proposed in the prior art a mixing valve for hot and cold water installations of the kind in which hot and cold water, respectively, are fed to a mixing chamber, each through its separate pipe system in a proportion determined by a spring activated pilot valve which is controlled by a resilient diaphragm inserted between the mixing chamber and a pressure chamber which communicates with a one pipe system through an inlet and an outlet passage, the outlet passage, which leads to the mixing chamber, being provided with a thermostatically operated valve the bimetallic control member of which is disposed in the mixing chamber. An essential feature of this mixing valve is that opposite the discharge opening of the outlet passage there is provided a closing plate attached to the bimetallic control member at an adjustable distance of the opening.

In one embodiment of the aforementioned mixing valve the opening of the outlet passage is formed in a regulating spindle adapted for axial displacement towards or away from the closing plate.

This embodiment of the regulating spindle suffers, however, from the drawback that when a handle which is mounted on the spindle is turned, it moves simultaneously towards or away from the front side of the valve casing, out through which the spindle projects, and this is inconvenient for the accurate reading of a scale provided on the front side and showing the position of the handle.

This drawback is remedied by a mixing valve according to the present invention thereby that the discharge opening of the outlet passage is formed in a sleeve mounted by means of a screwthread on the regulating spindle of the valve, which spindle is rotatable, but fixed in axial direction, the sleeve being by means of a resilient fork mounted in the valve casing prevented from turning with the regulating spindle.

As a result, the sleeve and consequently the discharge opening of the outlet passage are axially displaced when the handle and consequently the regulating spindle are turned in order to adjust the temperature of the temperate water and so any parallactic error in the reading of the said adjustment is avoided.

The invention will now be further described with reference to the drawings, in which—

Figure 1:
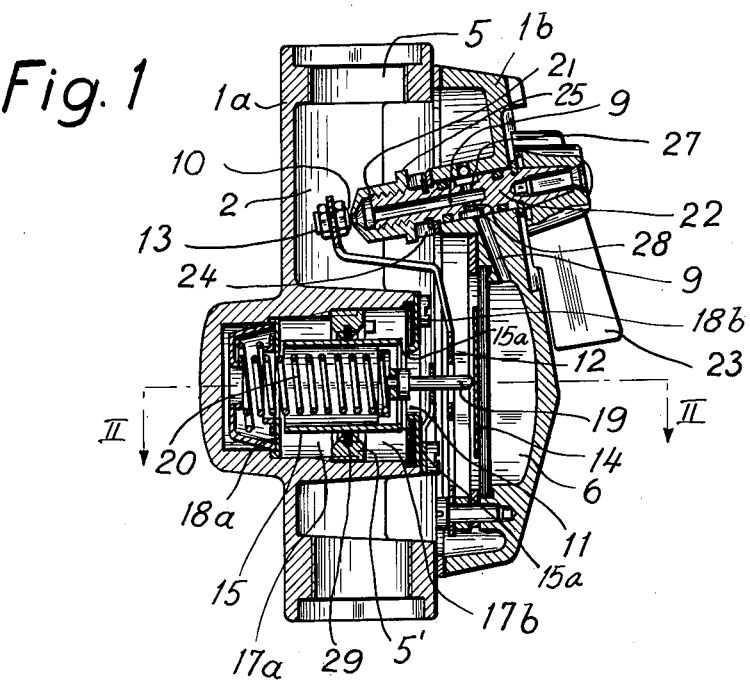
Figure 2:
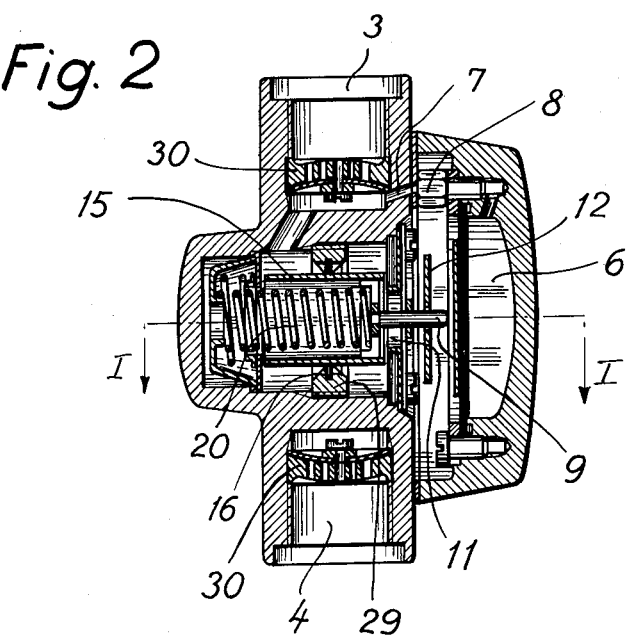
Figure 3:
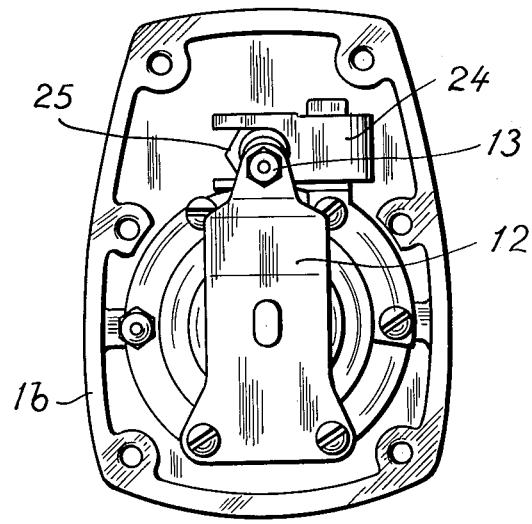
Figure 4:
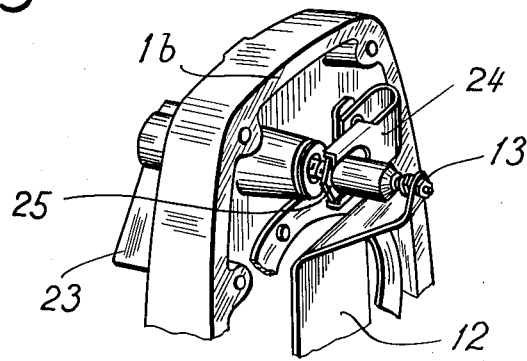

FIGURE 1 shows an embodiment of a mixing valve according to the invention in a section on the line I—I of FIGURE 2, FIGURE 2 is a section of the same on the line II—II of FIGURE 1, FIGURE 3 is a cover for same, viewed from the inner side of the cover, and FIGURE 4 is a perspective view of a detail of same.

The drawing shows a mixing valve consisting of a casing 1a with a cover 1b which in combination enclose a mixing chamber 2 and having an inlet opening 3 for connecting the valve to a cold water pipe, another inlet opening 4 for connection of a hot water pipe and discharge openings 5 and 5' for pipings leading to the points for tapping the temperate water. Between the inlet opening 3 and the mixing chamber 2 is inserted a pressure chamber 6, which through an inlet passage 7 formed in the casing 1a and provided with a throttle nozzle 8 communicates with the inlet opening 3, the pressure chamber 6 being further through an outlet passage 9 formed in the wall of the casing in communication with the mixing chamber 2. In the discharge opening of said passage 9 is a thermostatically operated pilot valve 10. The pilot valve 10 is controlled by a control member which is mounted in the mixing chamber 2 and may consist of a bimetallic leaf spring 12, one end of which is attached in the casing 1, whereas its other end is provided with a closing plate 13 cooperating with the discharge opening of the outlet passage 9 and constituting the pilot valve 10 for regulating the discharge from the pressure chamber 6 in accordance with the temperature of the temperate water. The bimetallic leaf spring 12 is of such construction that a temperatuse rise in the mixed water causes the closing plate 13 to move away from the discharge opening, whereas a reduction of the said temperature causes the closing plate 13 to move closer to the discharge opening so as to reduce the flow discharged. The pressure chamber 6 and the mixing chamber are separated by a resilient diaphragm 14 which controls a spring-activated valve inserted between the inlet openings 3 and 4 and the mixing chamber 2 and consisting of a hollow valve cylinder 15 which is guided in a seal ring 16 and the inner space of which is in direct communication with the mixing chamber 2 through an opening 11, the valve cylinder 15 being displaceable in its axial direction in a space formed in the casing 1 and divided into two spaces 17a and 17b by the seal ring 16 which establishes liquid-tight sealing wtih the outer surface of the valve cylinder 15. The edge sections or surfaces 15a of the cylinder 15 are adapted to cooperate with valve seats 18a and 18b mounted in endways position in the casing 1 in relation to the cylinder, which valve seats in combination with the said edge sections of the cylinder confine annular inlet openings, the flow areas of which are determined by the movements of the diaphragm 14. The valve seat 18a may as shown in the drawing be resiliently mounted, whereas the other valve seat 18b is in fixed position in the valve casing and preferably consists of a metal plate, such surface of the said plate as faces the valve cylinder being vulcanised with a rubber layer. By means of a pressure rod 19 the diaphragm 14 is connected with the valve cylinder 15 which is provided with a pressure spring 20 placed in the interior of the cylinder and counteracting the pressure exerted by the diaphragm 14, one end of the said spring being attached inside the cylinder, its other end resting against the valve casing, being for example passed through the central part of the resilient valve seat 18a which regulates the inlet opening leading to the cold water pipe system. When the water pressure in the pressure chamber 6 increases, for example because the bimetallic leaf spring 12 at falling temperature of the temperated water reduces the flow through the pilot valve 10 by means of the closing plate 13, or if the water pressure in the cold water pipe system increases for some reason, the diaphragm 14 will displace the valve cylinder 15, overcoming the action of the spring 20, that is, in the direction to the left in FIGURES 1 and 2, so that the flow area of the cold water inlet opening is reduced, while the flow area of the hot water inlet opening is increased, whereby the falling temperature of the temperate water or the increased pressure exerted by the cold water is counteracted by a reduced supply of cold water and an increased supply of hot water. The discharge opening for the outlet passage 9 is in accordance with the invention provided in a cap 21 which is formed with an axial discharge opening 21' and is mounted by screwthreads on a regulating spindle 22 which is fixed in axial direction but rotatable in the casing and provided with a handle 23. By means of a fork 24 which is resiliently mounted in the casing 1 and engages the hexagonal head 25 of the cap 21 the cap is prevented from turning with the regulating spindle 22. As a result, the cap 21 is displaced axially in the direction towards or away from the closing plate 13 when the handle 23 and consequently the regulating spindle 22 are turned over a scale 26 mounted on the front of the casing. A part of the outlet passage 9 is formed as a bore located coaxially in the regulating spindle, and by means of an annular neck 27 on the cylindrical surface of the spindle and transverse bores 28 the said bore communicates with such part of the outlet passage 9 as is located in the cover 1b.

The seal ring 16, which rests in an annular groove 29 provided in the casing 1, is made of resilient material such as rubber and in such manner that its cross-sectional area has the form of a truncated cone, its base being embedded in the groove 29 whereas its top rests against the outer surface of the valve cylinder 15. The cross-sectional area of the throttle nozzle 8 is preferably smaller than the area of the discharge opening of the outlet passage 9 in order to prevent a water pressure from being built up in the pressure chamber even though the discharge opening of the outlet passage 9 is entirely clear of the closing plate 13. In the inlet openings 3 and 4 for the cold and the hot water respectively, non-return valves 30 may be mounted in known manner at the entrance to the spaces 17a, 17b in order to prevent water from one pipe system from being forced into the other pipe system in case of any difference of water pressures in the two systems.

What I claim and desire to secure by Letters Patent is:

A mixing valve for hot and cold water comprising a casing having a cold-water inlet and a hot-water inlet and defining a mixing chamber, a spring-actuated main valve having a hollow valve cylinder disposed in said casing with the interior of said cylinder in direct communication with the mixing chamber and with said cylinder having edge surfaces adapted to cooperate with valve seats formed in said casing and defining annular openings, a pressure chamber, a resilient diaphragm disposed between the mixing chamber and the pressure chamber to control the areas of said annular openings, an inlet passage formed in the wall of said casing to provide communication between the cold water inlet and the pressure chamber and an outlet passage also formed in said casing to provide communication between the pressure chamber and the mixing chamber, said inlet passage having a cross-sectional area less than said outlet passage, a portion of said outlet passage being defined in a rotatable but axially-fixed axially-bored regulating spindle extending into the mixing chamber, and an axially-displaceable cap surrounding the free end of said spindle and being threaded upon said spindle, said cap having a discharge opening communicating with said outlet passage, a closing plate disposed opposite said opening, a bimetallic control member disposed inside the mixing chamber and supporting said plate and being adapted for adjustment towards and away from said discharge opening, and a resilient fork in the valve casing engaging a portion of said cap to prevent it from turning with the regulating spindle, whereby the cap is axially movable relatively to said spindle and said control member but is rotatably stationary.

References Cited in the file of this patent

UNITED STATES PATENTS

| | | |
|---|---|---|
| 1,128,778 | Hall | Feb. 16, 1915 |
| 1,347,329 | Hall | July 20, 1920 |
| 1,551,212 | Partlow | Aug. 25, 1925 |
| 2,517,056 | Trubert | Aug. 1, 1950 |
| 2,550,907 | Brown | May 1, 1951 |
| 2,830,765 | Beller | Apr. 15, 1958 |

FOREIGN PATENTS

| | | |
|---|---|---|
| 720,112 | France | Dec. 3, 1931 |